No. 628,748. Patented July 11, 1899.
J. T. BOYLES.
CLEVIS AND WHEEL ADJUSTING DEVICE FOR PLOWS.
(Application filed Mar. 21, 1899.)
(No Model.)
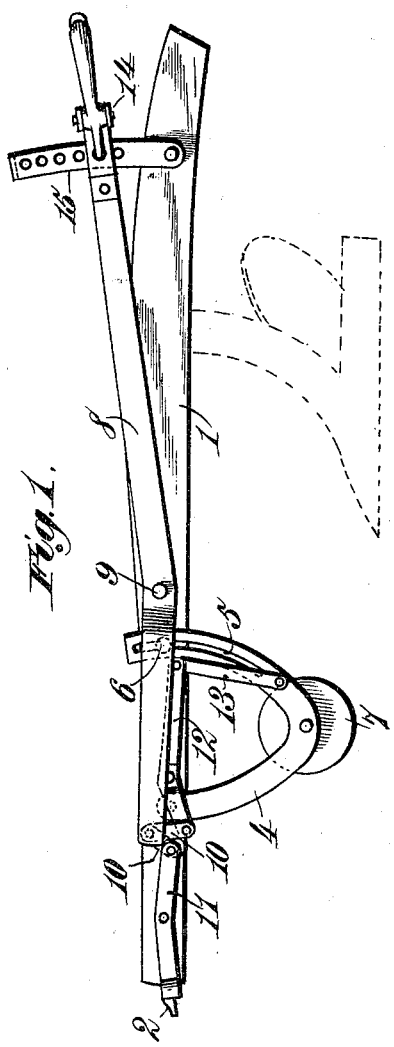
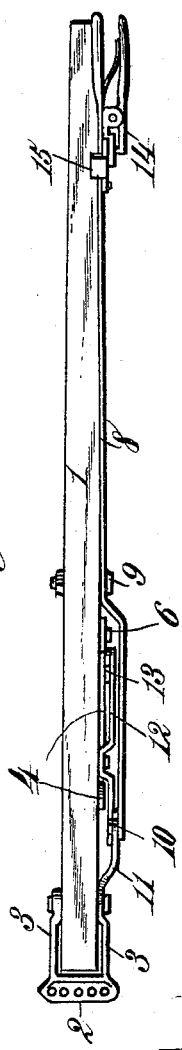
Witnesses.
Inventor:
James T. Boyles,
By
James L. Norris.
Atty.

UNITED STATES PATENT OFFICE.

JAMES T. BOYLES, OF MARTINSBURG, WEST VIRGINIA.

CLEVIS AND WHEEL ADJUSTING DEVICE FOR PLOWS.

SPECIFICATION forming part of Letters Patent No. 628,748, dated July 11, 1899.

Application filed March 21, 1899. Serial No. 709,997. (No model.)

*To all whom it may concern:*

Be it known that I, JAMES T. BOYLES, a citizen of the United States, residing at Martinsburg, in the county of Berkeley and State of West Virginia, have invented new and useful Improvements in Clevis and Wheel Adjusting Devices for Plows, of which the following is a specification.

My invention relates to clevis and wheel adjusting devices for plows, and has for its object to provide a simple and efficient lever mechanism for simultaneous adjustment of the clevis and wheel-standard of plows and other agricultural implements.

The invention is illustrated in the annexed drawings, in which—

Figure 1 is a side elevation of a plow provided with my improved lever mechanism for simultaneous adjustment of the clevis and wheel-standard. Fig. 2 is a plan view of the invention.

As shown in the drawings, the reference-numeral 1 designates the beam of a plow or other agricultural machine, and 2 a clevis provided with arms 3, pivotally attached to opposite sides of said beam. A wheel-standard 4, of segmental or yoke form, is pivoted at its forward end to one side of the plow-beam, and in the rear arm of this standard there is a segmental slot 5 for engaging a guide-pin 6 on one side of the beam. The wheel 7 is journaled to the lower curved portion of the standard.

To one side of the beam there is pivoted a lever 8 for adjusting both the clevis 2 and wheel-standard 4 according to requirements and so that the clevis and wheel-standard will be made adjustable together by a single movement of said lever. This lever 8 has its fulcrum 9 intermediate its ends, as shown. The forward end of the lever 8 carries a pair of toggle-links 10, one of which pivotally connects with a lever 11, that is rigidly attached to one of the pivotal clevis-arms 3, or may be integral therewith. The other link 10 pivotally connects with one arm of a lever 12, which is pivoted to the side of the beam 1 and has its other arm connected by a link 13 to the segmental wheel-standard 4 in order to permit adjustment of the same simultaneously with adjustment of the clevis. The handle end of the main lever 8 is provided with a spring-pressed latching-pawl 14 to normally engage a rack 15 on the beam 1, and thus hold the lever mechanism and the connected clevis and wheel-standard in any position to which they have been simultaneously adjusted by operation of said lever mechanism.

It will be observed that a single throw of the lever 8 in a proper direction will raise or lower the wheel-standard 4 and attached wheel 7, as may be desired, and at the same time will impart a reciprocal adjustment to the clevis 2, so as to maintain a proper draft to accord with the required depth of cut for the plow or other cultivating attachment.

The simultaneous adjustment of the clevis and wheel-standard is extremely useful with many agricultural implements, and the herein-described lever mechanism provides a very simple, efficient, and ready means for accomplishment of the desired adjustment.

What I claim as my invention is—

1. The combination with a plow-beam, of a wheel-carrying standard pivoted to the beam, a clevis also pivoted to said beam and having an attached, rearwardly-extending lever, and a pivoted, main operating-lever having connections with said rearwardly-extending lever of the clevis and with said wheel-carrying standard, for simultaneously swinging them on their pivotal attachments, substantially as described.

2. The combination with a clevis, a wheel-standard and a beam to which said clevis and standard are pivotally attached, of a lever fulcrumed on the beam and carrying a pair of toggle-links, a lever connecting one of said links with the pivoted clevis, and lever mechanism connecting the other one of said links with the pivotal wheel-standard, whereby the clevis and wheel-standard are made simultaneously adjustable, substantially as described.

3. The combination with the beam, the adjustable clevis, and the adjustable wheel-standard, of a main lever fulcrumed intermediate its ends on said beam, a pair of toggle-links carried by said main lever, a lever connecting one of said links with the clevis, lever devices connecting the other link with the wheel-standard, a latching-pawl on the main lever, and a rack to be engaged by said pawl, substantially as described.

In testimony whereof I have hereunto set my hand in presence of two subscribing witnesses.

JAMES T. BOYLES.

Witnesses:
L. W. ROBINSON,
JOHN W. DODD.